Dec. 3, 1968 H. PLACE 3,414,670

CODED DATA ENTRY AND TRANSMISSION APPARATUS

Filed Oct. 1, 1964 3 Sheets-Sheet 1

HARRY PLACE,
INVENTOR

CODED DATA ENTRY AND TRANSMISSION APPARATUS
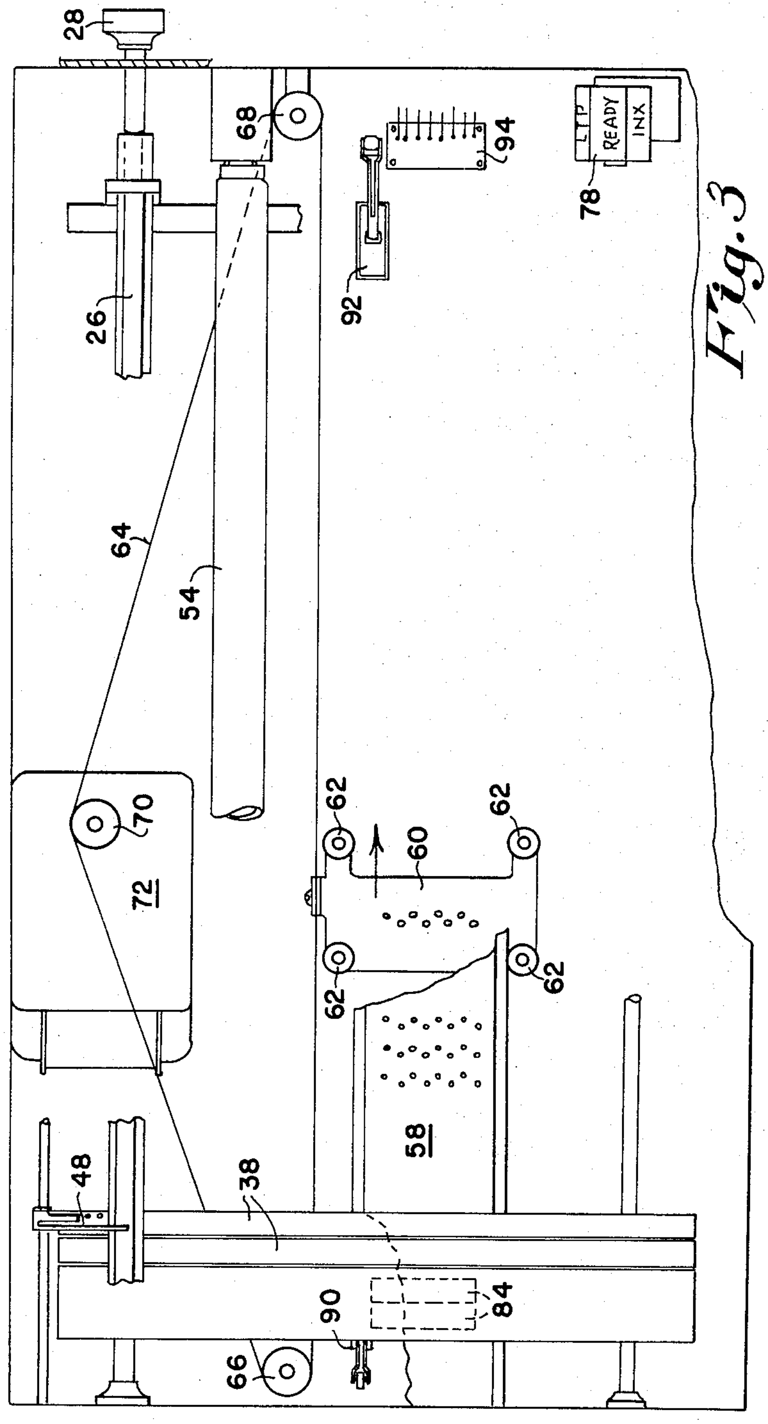
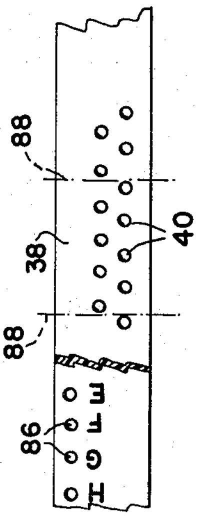
Fig. 4

Dec. 3, 1968 H. PLACE 3,414,670

CODED DATA ENTRY AND TRANSMISSION APPARATUS

Filed Oct. 1, 1964 3 Sheets-Sheet 3

United States Patent Office 3,414,670

Patented Dec. 3, 1968

3,414,670

CODED DATA ENTRY AND TRANSMISSION APPARATUS

Harry Place, Silver Spring, Md., assignor to Rixon Electronics, Inc., a corporation of Maryland Filed Oct. 1, 1964, Ser. No. 400,694
14 Claims. (Cl. 178—17)

ABSTRACT OF THE DISCLOSURE

Data encoding and transmission apparatus having a console whose major exposed face presents the narrow edges of multiple, interchangeable side-by-side stacked alpha/numeric coding modules, each of which includes a stylus-settable tape having readable code markings on a portion thereof available for readout within the console by a transversely traveling reading carriage, to provide variable message format, review-before-transmission, item correction and change, items-required indication, and other features. Provisions for code-bit mode conversion, error checking, and busy indication are included.

This invention pertains to apparatus for control by an operator or user, for selecting and encoding information that is to be transmitted in coded form over a transmission circuit or channel. It includes provisions for the rapid manual selection of a plurality of successive code groups that are to constitute the complete message, with complete freedom as to the time-order in which such selections are made. It also provides for a preliminary rapid review of the accuracy of such selections, and correction of any errors prior to actual transmission, and finally for the automatic sequential transmission of the code groups, in proper order, at a predetermined rate adapted to the demands of the communication system.

Coded data systems are in wide use for the transmission of information over long lines, circuits or channels, as well as over relatively shorter local channels, these circuits in any case terminating in printers or like information manifesting apparatus, data processors, and so on, or being used to interconnect computer systems. The adoption of "machine language" codes, such as the precisely defined sequential pulse codes of the teletypewriter industry, yields many advantages over aural or other "human language" transmission, including the more efficient use of the bandwidth and other capabilities, relative ease of error detection and correction, and others.

At the point where the original signals or information are supplied to such systems, however, the necessity for a human operator imposes limitations or requirements that have not been solved by known encoding devices. The primitive telegraph key requires long training if pulse duration and repetition rate are to be even approximately correct, the telephone dial transmits only a single accurate pulse group at a time, and existing keyboard encoders (such as the teletypewriter keyboard) are bulky, require operator training, and do not, without more, provide any form of pre-transmission verification of the message.

A further and most significant defect of such prior systems, which is overcome by the present invention, is the requirement that the operator select the code groups of a transmission in the same sequence as that in which they are to be transmitted. If the standard "format" of a message includes, for example, a name, an address and a telephone number, it is necessary for the operator to select the code groups in that sequence if later machine handling is to be successful. Often, however, the information comes to the operator in a different sequence and must be rearranged in some preliminary step (usually with pencil work on a printed form) before encoding or the operation of a keyboard or the like. The present invention solves this problem by allowing the operator to pre-select the codes for each information item in whatever random sequence they may come to him, using coding devices at the proper columnar positions to ensure their later transmission in the desired standard order. In effect, the particular code to be transmitted in each sequential position or block of the message is pre-selected and stored until the complete message is ready for transmission.

It is accordingly a principal object of the invention to provide a data-encoding device of very compact from which will allow even a relatively unskilled human operator to encode or set up long sequences of selected code groups very rapidly, in any order as regards the setting-up procedure, and which will enable the selected codes to be promptly verified by the user (and corrected individually, if in error) before they are transmitted in the desired sequence and at the optimum rate established for the transmission system or channel.

A further object of the invention is to provide such a data entry set or device whose design is mechanically and electrically simple, for long trouble-free life, relatively low cost, and a minimum power requirement.

Still another object of the invention is to provide such a data entry set which is of flexible design, permitting a choice as to the "format," or the number and order of characters or code groups constituting a message, and hence ready adaptation to the varying requirements of different data-handling systems or applications, or the different kinds of messages which may be needed in a particular system.

Yet another object is to provide a multi-column or "tabular" form of data entry set in which a selection of an initial or format-determining code group (which may designate the kind or nature of the message to be transmitted) will, if desired, automatically signify to the operator which of the other columns, or groups of columns, will require data entry operations in order to formulate a complete message. This selection of a format-determining code group may be under the control of a format-selecting knob or the like, set by the user prior to the setting up of the individual code-group selecting devices, or at any rate prior to the initiation of the transmisison.

A further object is to provide a data entry set having a large number of manually settable code-generating components which may be pre-set in any order or sequence, and whose setting directly establish (in preliminary stored form) the proper code group for each group-interval of the intended message, and also directly display to the operator (for review prior to or after actual transmission) the complete formulation of the message; together with means for clearing (re-setting to a zero or starting condition) all or any desired ones of the selecting components. Such individual resettability is of value not only for permitting the correction of an improper selection, but also to facilitate a subsequent transmission which may differ only in certain code-position selections from the one that was previously set up.

Another object is to provide a data entry set of the kind described with means for displaying a categorical answer or response to the user of the equipment, after he has accomplished a transmission, under the control of signals from the station or apparatus with which he is communicating.

In general, the objects of the invention are achieved by a side-by-side assembly of individual code-group selecting devices each comprising a flexible tape or ribbon partly wound over a spool or spools but having a straight portion lying along a display path in view of the operator; the tape being normally urged to a zero, starting or "home" position by a spring. The tape is provided with spaced indexing perforations or formations that are engageable by a stylus or the like (a ball-point pen can be used) held by the operator, and by which stylus it can readily be drawn to a selected position designated by the arival of the stylus at a stop or the like. The tapes carry visible indicia such as letters or numerals which are brought beneath a transverse window or slot to show the operator which code group has been selected by each, and a cover plate displays adjacent each tape a column of such letters or numerals, or both, to guide the operator in placing the stylus at the correct point. One of the tape devices may serve to select the "format" or kind of message being encoded, and may include electric switches to turn on the power supply and to control the illumination at the visual display slot or window, or appropriate portions thereof, to advise the operator of the necessity for supplying additional input settings at those units or columnar positions. Detents are provided to hold the tape of each unit device at its chosen postion, these being individually releasable to allow changes or corrections, and releasable as a group for the preparation of a succeeding message.

It has heretofore been proposed to select and transmit multi-bit binary code groups in a desired succession by providing aligned strips of material which, when slid relative to one another lengthwise will establish a linear sequence of code-hole or dash-and-dot perforations extending across all of the strips for sensing by a traveling stylus or the like. In such devices, the widths of the strips must be sufficient to enable the full binary code sequence of holes and blanks (or dot-holes and dash-holes) for each character (letter, digit, etc.) to be provided within the width of the strip, and such a sequence has to be provided for each character-position along each strip. In such prior art devices (exemplified by U.S. Patent 2,885,664) the hole-sensing element has to operate several times during its passage across each strip-width, and either the code strips must be unduly wide, or the sensing device must have an excessive fineness of touch (or resolving power, so to speak), or both. Any assembly of strips capable of formulating a lengthy code message must be correspondingly wide, and soon becomes of useless proportions.

Therefore, in accordance with the present invention, a coding scheme is provided in which each strip (which is opaque) carries a lengthwise array of code spots (typically, light-transmitting holes) whose size can be as large as permitted by the strip width. The arrangement of these holes, and their intervening opaque areas, is chosen so that for each longitudinal position of a strip, a unique combination of holes and spaces is presented to the sensing carriage, which scans simultaneously a fixed number (several) of the spot-positions, the number depending on the number of code bits constituting the standard code group. Accordingly, the strips themselves are serially scanned one after another, but the code bit groups of the various strips or tapes are scanned in parallel, the scanner read-out being serialized (if desired) by a commutator-like device such as a rotary switch synchronized with the carriage motion. Thus, a choice as to the output sequence is a further characteristic of the invention; it may be, for example, bit-parallel and character-sequential, as well as fully serial.

The invention will be better understood by referring now to a preferred embodiment thereof, shown in the accompanying drawings and described in detail so as to convey its nature to one skilled in the art, but without any intention thereby to limit the scope of the invention. In the drawings, FIG. 1 is a perspective view, partly broken away, of one preferred form of the data-entry and code-generating unit.

FIG. 3 is a fragmentary plan view, the top panel being largely broken away.

FIG. 4 is an enlarged fragmentary view of one of the aperture-coded tapes.

Figure 1:
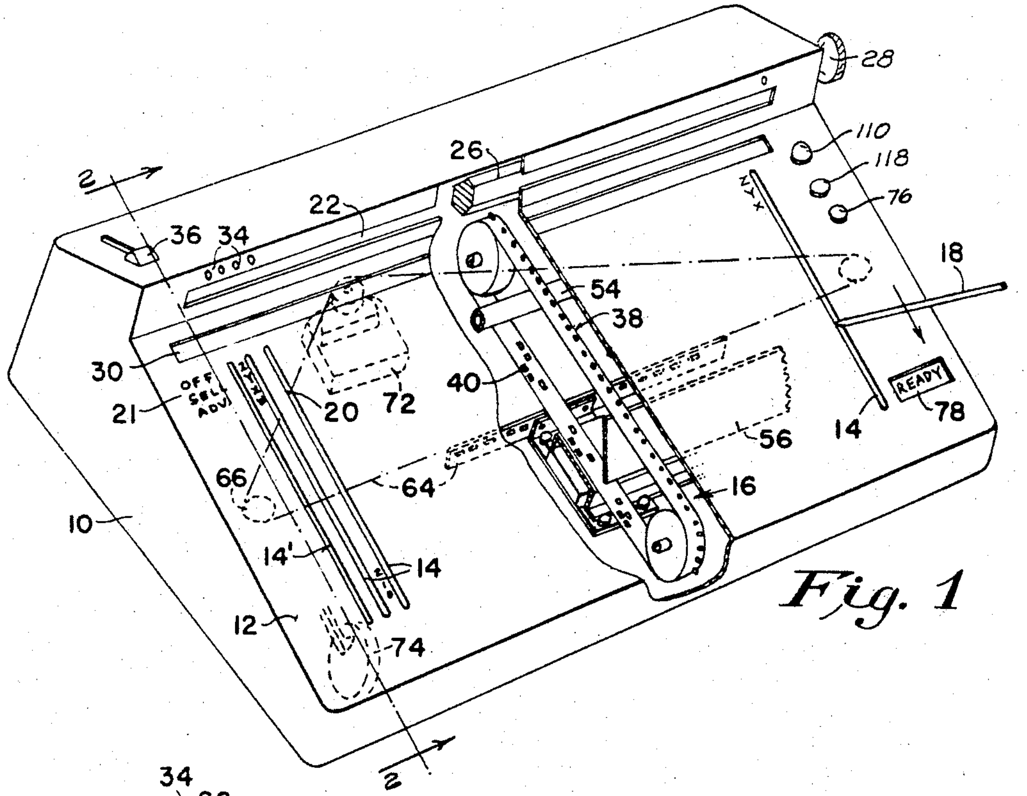

Referring first to FIG. 1 of the drawings, numeral 10 designates the over-all casing of the code generating unit, whose top surface panel 12 is perforated by a series of parallel slots 14, each corresponding to one selectable code group device 16, these devices being set in turn by inserting a stylus 18 in the respective slots at the desired character position, and moving the stylus to the lower (forward) limit of the slot. The proper position for insertion of the stylus in each slot is indicated by a scale 20 marked on panel 12 alongside each slot, these being scales of letters, digits or other symbols appropriate to the intended use of the apparatus. The stylus motion, as will appear, serves to move a code-selecting flexible tape to establish a spot code pattern for transverse scanning. All of the devices 16 are physically identical, although their code tapes may be differently marked so that some are employed solely for letter-character transmissions or code-groups, some solely for digit-character transmission, etc.

Separate coding of letters and digits is not needed if the receiving device, such as a computer, is conditioned to recognize the proper meaning according to the position, within a complete message, of a particular code group. This will normally be the case where the system calls for a fixed number of code groups per transmitted message, any idle or unselected devices 16 generating an arbitrary code group to fill out the fixed message length. In the case of devices 16 used to select a single digit, for example, the panel slots 14 may be made appropriately shorter than for alphabetic selections.

In the particular embodiment being described, the code groups established or selected by tape devices 16 will ultimately be transmitted by scanning the devices from left to right in FIG. 1, and the tape beneath the leftmost slot 14′ selects a code group designating the kind of transaction with which the transmission is concerned, and hence establishes the "format" of particular other devices which must be set to complete the standard information for such a transaction. The wide space on panel 12 to the left of slot 14′ provides adequate space for a listing 21 of the names or abbreviations of such transactions, and also provides space beneath the panel for a set of relatively unchanging code-group generating units which may, for example, generate code groups serving to identify the transmitted message with its station of origin.

Certain transactions, or classes of messages, will not require the setting of all of the devices 16, but only those at certain columns of the panel display, as mentioned above. By switching means to be described below, the operation of selecting a transaction at slot 14′ may, in addition to selecting a particular code group identifying the kind of transaction, selectively energize lamps associated with the other devices 16, or groups thereof, to provide an illuminated display through a transverse panel window or slot 22, positioned beyond the heads of the slots 14. The column-headings thus illuminated are provided on a rotatable bar 26, shown as of hexagonal cross-section, and settable by the operator by use of a knob 28 for format selection. As indicated at 29 in FIG. 2, the bar 26, suitably detented, may be connected to the tape spool of the tape beneath slot 14′ so that the format-indicating code group will automatically be properly chosen.

Figure 2:
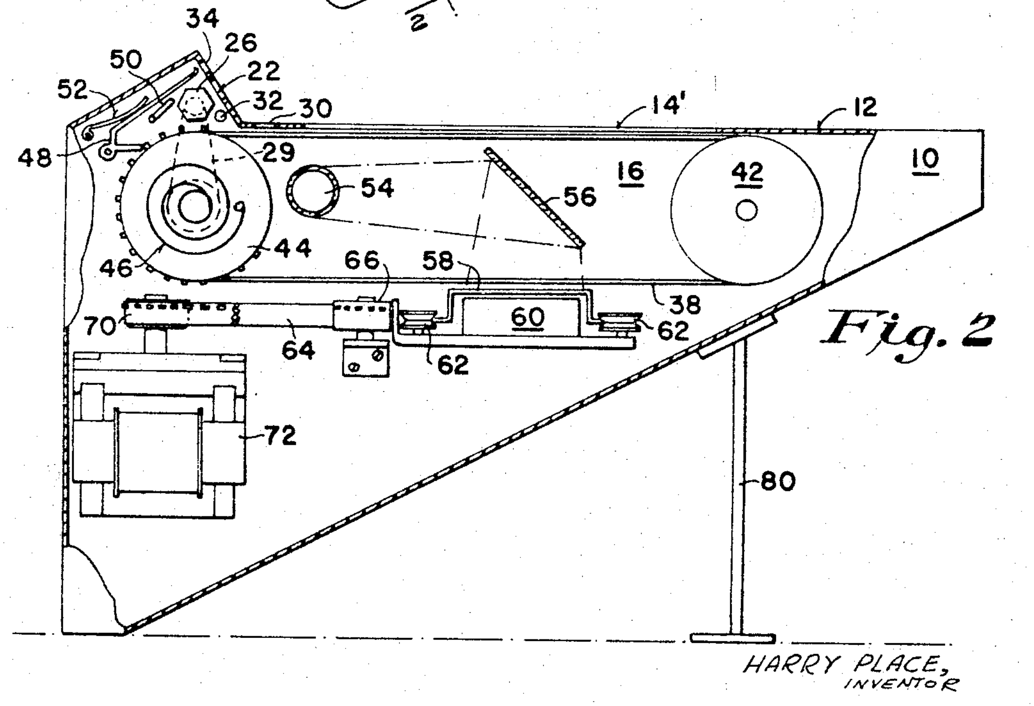
FIG. 2 is a sectional view taken along line 2—2 of FIG. 1.

The selective illumination of the appropriate column headings will serve to advise the operator as to which of the tape devices are required to be set, and may also preferentially illuminate, through mere proximity, a character marking along each tape edge that is visible through another crosswise window or slot 30, thus aiding the operator in recognizing the character to which each chosen tape device has been set. A lamp 32 is indicated in FIG. 2 as typical of several such, the one switched "on" being the source of such selective illumination; however, such illumination is not essential to the broader purposes of the invention, and the character markings on the various tapes may also be directly visible through the slot 30 under ordinary room illumination levels. A switch also controlled by the motion of the format-selecting tape (beneath slot 14') away from its home or zero-displacement position may also conveniently be employed to turn on the A.C. power for the entire unit.

Since the code-generating scanning of the devices 16 is not initiated until the operator has first set all the required devices and checked their settings as displayed in slot window 30, any erroneous selection is readily observed, and can be corrected individually by inserting stylus 18 in a panel aperture 34 positioned in alignment with each respective slot 14, to reset the corresponding device to its rest (non-selected) condition. The correct setting for that device is then obtained as already described. Manual resetting of the entire group of devices 16 is obtained, when required, by operating "reset" button 36, suitably arranged to operate a common or universal resetting bar 50 or shaft to actuate all of the individual detents to "reset" position.

FIG. 1 is broken away to show the disposition of typical code-group generating devices or "storage units" 16. Each device 16 includes an endless flexible opaque tape 38 perforated with sprocket holes to receive the tip of stylus 18 at any of a plurality of equally-spaced positions along its length, beneath slot 14, the tape carrying visible indicia of the letters, digits or the like for display through window 30, and also containing coded apertures 40 for code generation. These code apertures are positioned on tape 38 generally along the lower pass of the tape as it travels between a take-up wheel 42 of each device 16 to a sprocket wheel 44, all of these wheels being mounted for rotation upon common transverse shafts in the casing 10, with the tapes stretched between respective pairs thereof.

The sprocket wheel 44 is urged in one direction (counter-clockwise in FIG. 2) by a light spiral spring 46 against a fixed stop, and as stylus 18 draws each tape to a set position, the sprocket wheel is turned clockwise and retained in its set position by a detent arm or pawl 48 acting on the sprocket pins. The detent arms are likewise journalled on a common transverse shaft in the casing, and each has a forward tip engaged by the stylus when inserted in the reset aperture 34, to lift the detent arm and allow the corresponding tape to be restored to its home or non-set position. Common reset button 36 is connected to move a common or universal reset bar 50 pivoted in the casing, and serving to lift all of the detents away from their sprocket wheels, to reset the entire array of devices 16. A light leaf spring 52 normally urges each of the detent arms into engagement with its associated sprocket wheel pins.

A tubular linear-filament incandescent lamp 54 extends transversely of the casing 10 and within the loops formed by the tapes 38, and its rays are directed by a transverse strip mirror 56 to the region occupied by the tape code perforations that correspond to the characters selected by the set positions of all the tapes. Thence, the light passes downward through the tape perforations and through limiting apertures pierced through a fixed plate 58 whose lateral edges form guides for a carriage 60 having grooved antifriction rollers 62 engaging the said edges. Carriage 60 contains an array of photoelectrically sensitive junction devices (P-N junction photodiodes) which respond selectively to the illumination patterns defined by the individually-set code patterns brought into play by the setting of the respective unit devices 16, as the carriage 60 travels crosswise of the casing (from left to right in FIG. 1).

An endless sprocket-hole drive tape 64 is connected to the carriage 60, and passes around guide rollers 66, 68 in the casing, and also around a drive sprocket 70 driven by a suitable drive motor 72 energized by a control circuit to be described below. Before proceeding with that description, it is noted that FIG. 1 also indicates the position of a switch 74 associated with the code-generating unit 16 beneath slot 14', and which unit, it will be recalled, is intended to establish the "format" or kind of message that will be sent. This switch is operated when this particular code unit 16 is operated away from its "home" or rest position, and as mentioned above may control the A.C. power supply to the entire unit, as well as selectively illuminating the column headings visible through window 22 (and/or the indicia viewed through window 30) by means of light sources 32, when this feature is employed. FIG. 1 also indicates at 76 a "start transmission" control button or switch that serves, when a complete message has been set up and verified, to initiate the carriage scanning motion, and actual code pulse generation. In some installations, of course, the actual start of transmission may be under control of a command from the remote station, after the operator has indicated by the button 76 that the message is otherwise ready for transmission.

The window 78 in FIG. 1 exposes to the operator's view selected reply-message indicia under remote control, such as a categorical reply in answer to his previously transmitted message. This indicator may be a simple stepper-switch controlled drum, illuminated from within by a lamp, and stepped in response to a numerical pulse group received from the remote station. Resetting of the drum to its home position, by conventional stepping or release action, is preferably initiated at the end of each transmission, to clear any previous reply indication automatically. In order to allow the entire device to be used either on a flat horizontal surface such as a desk, or mounted upon a vertical wall panel, the outer casing is shaped as indicated in FIG. 2, so that when the under surface is horizontal, the front panel 12 will be held in a convenient slanted position. For wall mounting, brackets such as at 80 are secured to the under surface, to hold the front panel 12 vertical in that kind of installation.

FIG. 3 illustrates the parts as already described, with sections of the casing and overlying components broken away for clarity. Carriage 60 is shown in plane view, the optical entrance windows of its sensing devices being arranged for greater compactness in two staggered rows of four each. The fixed plate 58, whose lateral edges form the guide and support for the carriage, contains beneath each tape 38 a similarly staggered pair of rows of apertures 82, so that light can reach the sensing devices only during the time in which the carriage is approximately centered beneath the coded section of each tape. The light paths through the apertures 82 are selectively blocked by the coded tapes 38, in accordance with the lengthwise position of each tape as selected by the setting stylus. Accordingly, as the carriage scans from left to right, the codes of the various storage units 16 will be read in turn, at a rate determined by the carriage speed. However, in advance of the scanning of the left-most or "first" tape 16, the carriage will scan the fixed code aperture combinations set up by holes in a plate 84 to the left of the first tape, to generate the identification code groups associated with this particular transmitting station.

FIG. 4 is an enlarged fragmentary view of one of the code tapes 38, showing the sprocket holes at 86, which of course need not extend into the coding area of the tape, but only so far as to permit the tape movement that is required for the entire range of code-selecting increments (a distancet approximately equal to the lengths of slots 14). In the remaining length of each tape, the coding apertures 40 are provided, in a permutated pattern such that as each tape is set, the particular combination of holes and blank spaces (un-perforated hole positions) that lies beneath the carriage-scanning span indicated between dash lines 88, corresponds to the four-out-of-eight bit self-checking binary code chosen for the system. Obviously, other code group systems can be employed, by changing the patterns of perforations in the tapes, and with corresponding changes in the aperature plate 58 if necessary.

Two limit switches 90 and 92 are shown in FIG. 3, aligned along the path of movement of carriage 60, these serving to control the drive motor 72 in its forward and reverse motions to accomplish the scanning and transmission of the codes, and thereafter to return the carriage idly to its starting position. The connections to the sensing devices in carriage 60 are preferably completed through a flexible cable, not shown, terminating at the connection block 94 and thence connected to the switching circuitry to be described below.

Figure 5:
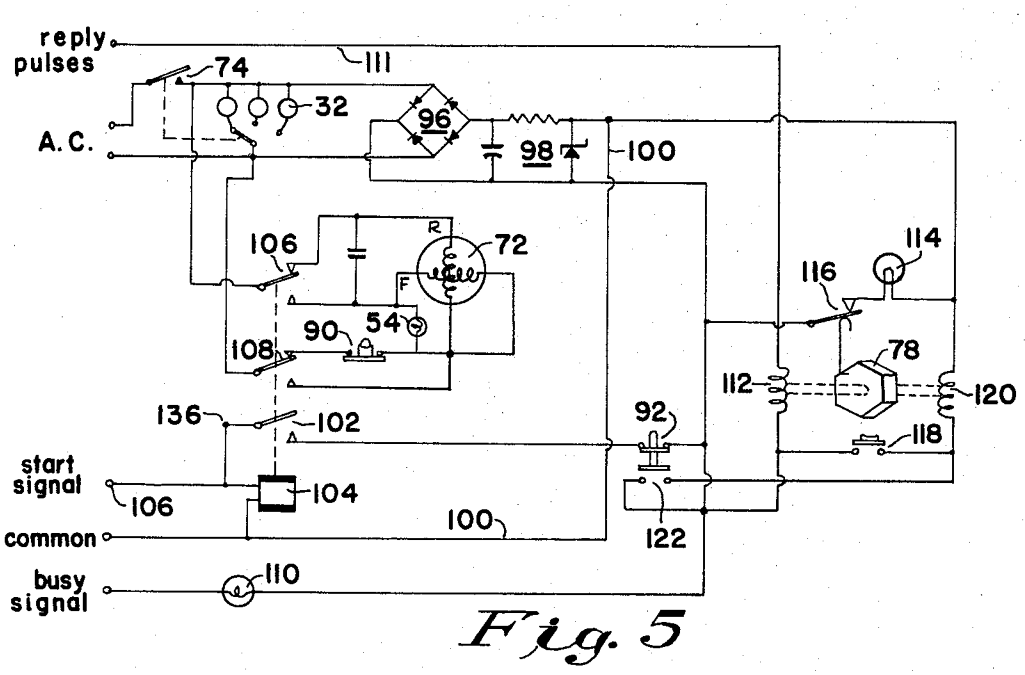
FIG. 5 is a schematic diagram of the sensing carriage drive circuitry and that of the answer or reply-display stepper.

Suitable control circuitry for the apparatus is detailed in FIG. 5 of the drawings, which show the A.C. supply connected through switch 74 to a conventional bridge rectifier 96 and associated filter and regulator 98, supplying direct current to a common lead 100 and, via normally-closed contacts of the forward limit switch 92, to self-holding contacts 102 of a relay 104. When a start signal voltage is received at terminal 106 (either from the remote station or by reason of operation of button switch 76, FIG. 1) the relay 104 operates, and is held operated by its contacts 102 until the carriage has reached the limit of its forward travel, when the opening of the normally-closed contacts of switch 92 releases the relay. When the A.C. power switch is closed (this switch is disignated 74, as it may be operated by the first movement of the left-most tape unit 16 as already described), and before operation of relay 104 as just mentioned, an indicator lamp 32 (or a selected one or more of several associated with different groups of tape units) is energized, as is the rectifier unit. A.C. power is also delivered through normally closed contacts 106 of the relay 104 to the "reverse" winding of motor 72, but if the carriage is already in its home position, reverse limit switch 90 will interrupt the return circuit through the contacts 108 of the relay. The various tape storage units are now set by the operator in the manner described above.

When the start voltage is applied momentarily to relay 104, and it locks itself operated as described, the A.C. supply circuit is completed by normally-open relay contacts to the lamp 54 and to the "forward" winding of motor 72, and the carriage is driven along the array of code tapes to generate the code sequences selected thereby. When the carriage reaches the right-hand limit of its travel (with reference to FIG. 3), forward limit switch 92 operates, interrupting the holding circuit of relay 104, which releases and thereby deenergizes lamp 54 and completes the A.C. circuit via contacts 106 through the reverse winding of the motor, limit switch 90 being now closed and remaining so until the carriage has been fully returned to the starting position. The indicator lamp 32 will remain on until such time as the switch 74 is opened, as by the resetting of the first code-generating unit to its "home" or un-set condition.

A busy indicator lamp 110 may be provided for use when more than one of the data-encoding devices is connected to control a single data-tone subset, so arranged for control by well known busy-indicating circuitry that it will be lighted at all units other than the one being employed for transmission, to prevent conflict in data-tone subset control that would otherwise arise. In a similar way, the busy indicating lamp may be wired to prevent an operator from inadvertently transmitting data tones or other signals to a remote computer or the like, where the system allows several different stations to take control of such a computer in turn, as over telephone lines or the like.

The reply or answer-back drum indicator is shown at the right side of FIG. 5, this circuit responding to numerical reply pulses received over the conductor 111 which is connected to the stepper magnet coil 112 of the indicator. These pulses rotate the drum to bring the proper signal into view at window 78 (FIG. 1), and the illumination source (lamp 114 within the drum) is lighted through off-normal contacts 116 of the stepper. If a manual resetting to zero position of this drum is desired, a manual switch 118 may be operated to apply D.C. voltage from the rectifier to the reset or release magnet 120 of the stepper apparatus. Alternatively, the resetting may be automatic, in response to the closure of the normally-open contacts 122 of forward limit switch 92, upon completion of each message transmisison.

Figure 6:
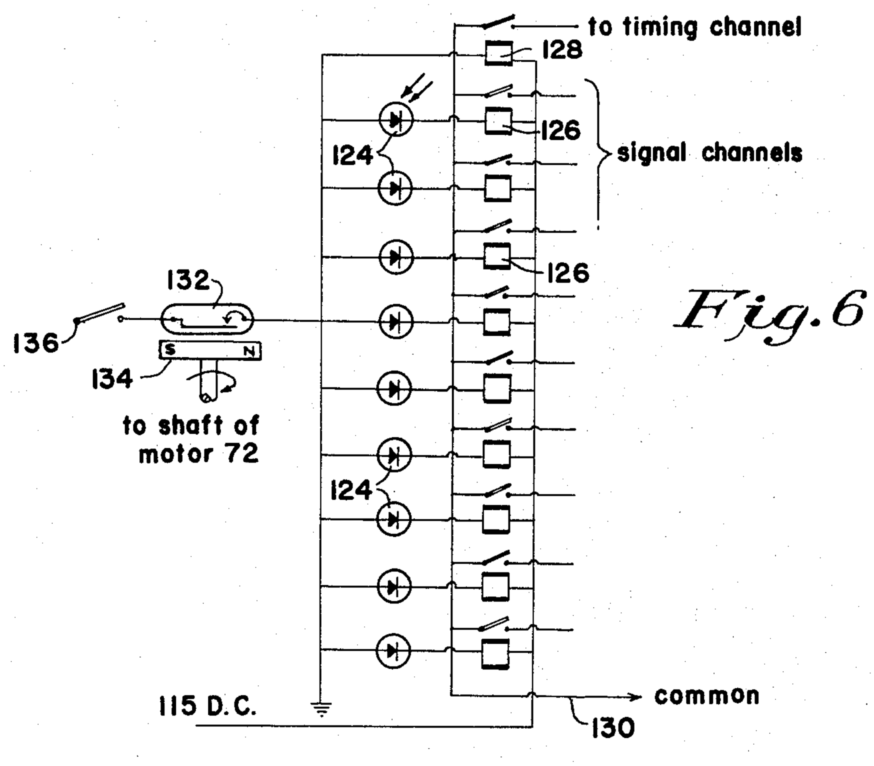
FIG. 6 is a similar schematic of the circuits of the sensing devices and their sampling switch.

The sensing devices within carriage 60 are indicated in FIG. 6 as P-N junction photodiodes 124, these furnishing ample power, when illuminated, to operate respective reed relays 126 supplying signal pulse power to the output channels as indicated. An extra relay 128 provides a separate timing or clock pulse if desired or required by the transmission system. The common lead 130 from the relay contacts enables the transmission channel conductors to be isolated from the DC control circuits of the apparatus itself. It will be understood that these relays may control either DC or AC output circuits, a data tone set, a modulator for radio frequency transmission, or any other type of transmission apparatus, which does not form a part of the present invention.

While the presence of aperture plate 58 (FIG. 3) allows the light from lamp 54 to penetrate the code tape apertures only during the period when the carriage is beneath each tape, it is preferred to allow actual sensing by the photodiodes only for a very brief interval at the correct instant, so as to ensure accurate transmission and reasonable tolerances in the positioning of the tapes and their code holes. To this end, a sampling switch is provided, shown as a magnetic reed switch 132 in the supply circuits of the photodiodes, and closed momentarily during the passage of the carriage beneath each tape, by the action of a rotating permanent magnet 134 driven by, or synchronized with, the motor 72. This feature provides a definite moment of initiation of each signal pulse, and also ensures a definite cut-off of the pulse even if the photodiodes, as is characteristic of some such devices, should remain conducting after the termination of their illumination, and until interruption of the current through them. The current supply for reed switch 132 is preferably obtained from the rectifier via contacts 102 of relay 104 of FIG. 5 (at point 136 in that figure, for example), to prevent spurious signals as the carriage executes its return-to-home movement.

It is a characteristic of the invention that a unique selection of "marks" and "spaces" (more specifically, of code holes and unperforated hole-positions) for all of the selectable letters, digits or signs, is achieved even though the tapes 38 are advanced a single hole space in changing the selection from one letter (for example) to the next succeeding letter. With the proper selection of assigned codes meeting this requirement, it is unnecessary to move the tapes a greater distance to achieve unique code selections. In the case of a 4-out-of-8 code, for example, only four of the 8 code holes 40 shown between lines 88 in FIG. 4, will actually be perforated, the other four hole positions being not perforated, and hence opaque. It is the relative positions of the four actual holes that determine the code that is transmitted, and for each one-hole space increment in motion of the tape, a unique pattern of the actual holes is to be presented in the scanning region between lines 88. Such a code system is aptly described as one in which the complete hole pattern of the entire tape length does not contain any repetitions of groups that are as long as 8 hole-positions; more generally, as long as $m$, where $m$ is the total number of bits in the standard code group.

Where, as herein, the coded tapes are sensed by transmitted light, it is immaterial whether the "mark" holes are actual perforations in the opaque tape material, or are merely light-transmitting portions, as where an opaque coating of the tape is interrupted to form the "hole."

In referring above to the light-sensing devices as "photodiodes" or P-N junction devices, I do not mean to exclude other light-sensing devices such as photocells, NPNP photoswitches, or the like. Also, while a "4 out of 8" bit time-parallel code has been specifically referred to above, those skilled in the art will recognize that a telegraphic type of coded output, with time-serial bit output, can readily be utilized with minor changes in the sensing scheme employed, or by means of parallel-to-serial code conversion devices.

The invention has thus been disclosed herein in connection with a specific embodiment, by way of explanation and example, but many other variations in detail will occur to those skilled in the art, and it is not intended to exclude such variations from the scope of the invention, except as may be required by the language of the appended claims.

What is claimed is:

1. A message-composing code signal generator for generating successive code groups of up to $n$ signal bits, comprising a plurality of juxtaposed elongate members individually adjustable in their lengthwise direction to select the order of code bit succession, each member carrying at least one lengthwise array of sensible code bit marks unequally spaced along it said direction, and a scanning head movable transversely of said plurality of members, said scanning head including $n$ mark-sensing elements spaced apart in said direction for sensing as many as $n$ code bit marks occupying a fixed fractional portion of the length of the array on successive ones of said members, as said scanning head undergoes such transverse movement.

2. A code signal generator in accordance with claim 1, in which each of said members comprises an endless loop of flexible tape.

3. A code signal generator in accordance with claim 2, including spools on which said tape is mounted, and means for urging said tape constantly in one direction toward a limiting position.

4. A code signal generator in accordance with claim 2, in which said tape is sprocket-perforated lengthwise thereof, to facilitate its positioning adjustment by a stylus engaging the perforations

5. A code signal generator in accordance with claim 4, and ratchet means associated with one of said spools to detent the tape in an adjusted position.

6. A code signal generator in accordance with claim 5, including means for selectively releasing said ratchet means to allow restoration of said tape toward its limiting position.

7. A code signal generator in accordance with claim 5, including ganged release means for simultaneously releasing the ratchet means of all of said members.

8. A code signal generator in accordance with claim 1, including motor means for driving the scanning head transversely of said members.

9. A code signal generator in accordance with claim 8, including means for automatically reversing the direction of action of said motor means upon completion of one traverse thereof.

10. A code signal generator in accordance with claim 1, in which each of said members also carries spaced indicia indicative of the adjustment thereof in said one direction, and a cover plate for said members; said cover plate being slotted to expose a selected one of the indicia of each member to view.

11. A code signal generator in accordance with claim 10, in which one of said members includes a switch for completing a selected circuit in accordance with the positional adjustment of said member, and circuits connected to said switch for illuminating the indicia-bearing portions of at least some of said members.

12. A code signal generator for generating successive code groups of signal bits, comprising a plurality of juxtaposed elongated members individually adjustable in their lengthwise direction to select the order of code bit succession, each member carrying an array of sensible code bit marks unequally spaced along its lengthwise dimension, and a scanning head movable transversely of said plurality of members, said scanning head including spaced mark-sensing elements for sensing the several code bit marks occupying a fixed fractional portion of the length of the array on successive ones of said members as said scanning head undergoes such transverse movement.

13. A data encoding console comprising:

(a) an array of longitudinally movable code-selecting elements arranged for selective lengthwise positioning in accordance with respective code groups to be transmitted, each of said elements having distributed lengthwise thereof a succession of code-group defining sensible markings, whereby the geometrical sequence of particular code groups displayed within a limited region along a path transverse to the lengths of said elements will uniquely represent their longitudinal positions; and (b) code-group sensing means mounted for travel along such a transverse path to sense in turn the particular code groups established by the positions of said elements relative to said limited region, for transmission over a signal output channel.

14. A data encoding console in accordance with claim 13, in which said elements comprise flexible opaque tape loops, perforations in said tapes constituting said markings, and a linear light source extending cross-wise of and within all of said loops.

References Cited

UNITED STATES PATENTS

| | | | |
|---|---|---|---|
| 2,723,308 | 11/1955 | Vroom | 178—17 |
| 3,146,439 | 8/1964 | Sedaris | 340—365 |
| 3,204,046 | 8/1965 | Ries | 179—90.2 |
| 3,229,036 | 1/1966 | Hillyer | 178—17 |
| 3,248,700 | 4/1966 | Sinn | 178—17 |

THOMAS A. ROBINSON, *Primary Examiner.*